United States Patent
Spatafore

(10) Patent No.: US 8,032,687 B2
(45) Date of Patent: Oct. 4, 2011

(54) METHOD, SYSTEM, AND APPARATUS FOR SUPPORTING LIMITED ADDRESS MODE MEMORY ACCESS

(75) Inventor: David R. Spatafore, Blaine, MN (US)

(73) Assignee: Unisys Corporation, Blue Bell, PA (US)

( * ) Notice: Subject to any disclaimer, the term of this patent is extended or adjusted under 35 U.S.C. 154(b) by 401 days.

(21) Appl. No.: 12/370,149

(22) Filed: Feb. 12, 2009

(65) Prior Publication Data
US 2010/0205385 A1    Aug. 12, 2010

(51) Int. Cl.
   G06F 12/00    (2006.01)
(52) U.S. Cl. .............. 711/2; 711/154; 711/E12.001
(58) Field of Classification Search .............. None
   See application file for complete search history.

(56) References Cited

U.S. PATENT DOCUMENTS

| | | | | |
|---|---|---|---|---|
| 4,779,187 A | * | 10/1988 | Letwin | 712/229 |
| 4,825,358 A | * | 4/1989 | Letwin | 713/1 |
| 5,027,273 A | * | 6/1991 | Letwin | 713/600 |
| 5,237,669 A | * | 8/1993 | Spear et al. | 711/2 |
| 5,561,788 A | * | 10/1996 | Letwin | 703/22 |
| 5,642,491 A | * | 6/1997 | Rose et al. | 711/2 |
| 7,100,028 B2 | * | 8/2006 | McGrath et al. | 712/229 |
| 7,380,095 B2 | * | 5/2008 | Matheny | 711/202 |
| 2003/0105935 A1 | * | 6/2003 | Moore | 711/171 |
| 2004/0250053 A1 | * | 12/2004 | McGrath et al. | 712/229 |

* cited by examiner

Primary Examiner — Kevin Verbrugge
(74) Attorney, Agent, or Firm — Robert P. Marley

(57) ABSTRACT

Supporting limited address mode memory access involves receiving a write request from the processor targeted to a first predetermined address. A data portion of the write request includes a target address of the system memory. In response to determining the write request is targeted to the first predetermined address, the target address is sent via a system interface to be stored in a configuration register of the processor director. A memory access request targeted to a second predetermined address is received from the processor. In response to determining the memory access request is targeted to the second predetermined address, the target address is retrieved from the configuration register of the processor director. The memory access is serviced using the target address retrieved from the configuration register.

20 Claims, 4 Drawing Sheets

METHOD, SYSTEM, AND APPARATUS FOR SUPPORTING LIMITED ADDRESS MODE MEMORY ACCESS

FIELD OF THE INVENTION

The present invention relates in general to computer architectures, and more particularly to architectures that support limited address mode memory access.

BACKGROUND

The term "Moore's Law" refers to an observation that, since the time modern integrated circuits (ICs) have first been commercially produced, the number of transistors that can economically be placed on an IC increases exponentially, doubling approximately every two years. So far, Moore's Law has proven to be reliably predictive of the capabilities of digital electronic devices, such as the processing speed of central processing units (CPUs). A related trend is seen in the storage capacity for random access memory (RAM). Over time, RAM storage capacity has increased at about the same rate as processing power.

One side-effect of the huge growth in RAM capacity is that some computing architectures are not capable of natively accessing the large amounts of RAM that may be available on modern hardware. For example, at certain times during operation of a computer, the instruction processor(s) which execute software are limited in the address space they can directly access. For example, a processor may be limited to 16-bit or 32-bit addresses in certain modes, but have full address capability of 40 bits or greater during normal operation. In such a case, the processor would only be able to directly access memory locations up to FFFFh (16 bit) or FFFF_FFFFh (32 bit), even though memory locations up to FF_FFFF_FFFFh may exist.

Nonetheless, there are advantages in having large amounts of available RAM. As a result, computing architecture adaptations have been made to allow limited address space processors/processor modes to access data and instructions anywhere in available system memory. In some cases, system software has been used to ensure memory access conforms to the address limitations. While relatively easy to implement, such a software solution generally slows performance.

SUMMARY

The present invention is directed to methods, apparatuses, and systems for supporting limited address mode memory access. In one embodiment, a method supports limited address mode memory access via a processor director that couples a processor to system memory. The method involves receiving a write request from the processor targeted to a first predetermined address. A data portion of the write request includes a target address of the system memory. The target address is sent via a system interface that couples the processor directory to the system memory and system hardware. The target address is targeted to be stored in a configuration register of the processor director in response to determining the write request is targeted to the first predetermined address. A memory access request is received from the processor targeted to a second predetermined address. The target address is retrieved from the configuration register of the processor director in response to determining the memory access request is targeted to the second predetermined address. The memory access request is then serviced using the target address retrieved from the configuration register.

In a more particular embodiment of the method, the processor director may be coupled to the system memory via a configuration interface, and the configuration interface is coupled to the configuration register within the processor director. In such a case, sending the target address to be stored in the configuration register may involve sending the target address via the system interface and receiving the target address via the configuration interface. In other more particular embodiments, the first and second predetermined addresses may be stored at the configuration register at a system boot time. In such a case, the first and second predetermined addresses are determined from the configuration register.

In yet another more particular embodiment, the write request and memory access request may be received from the processor operating in one of a plurality of limited address modes. In such a case, the plurality of limited address modes may include any combination of a real-mode, protected mode, and system management mode. In another variation on this case, the processor may be operating in a selected one of the limited address modes while a Basic Input/Output System (BIOS) is executing at a system boot time. In yet another variation, the method may further involve storing unique sets of first and second predetermined address in the configuration register. Each of the sets is dedicated to a separate one of the limited address modes, and the method in this variation further involves determining the first and second predetermined addresses from the configuration register based on the currently operating limited address mode.

In another embodiment of the invention, an apparatus includes a front side bus interface that interfaces with one or more central processing units. A system interface of the apparatus interfaces with system memory and system hardware. The apparatus includes a configuration interface the interfaces with the system hardware for receiving configuration requests. The apparatus further includes a configuration register coupled to the configuration interface and a logic block. The logic block is coupled to the front side bus interface, the system interface, and the configuration register. The logic block is configured to receive, via the front side bus interface, a write request that includes a target address of the system memory in a data portion of the write request.

In response to determining the write request is targeted to a first predetermined address, the logic block sends the target address via the system interface targeted for the configuration register. The configuration register receives the target address via the configuration interface and stores the target address in response thereto. The logic block receives a memory access request via the front side bus interface, and retrieves the target address from the configuration register in response to determining that the memory access request is targeted to a second predetermined address. The logic block then services the memory access request via the system interface using the target address retrieved from the configuration register.

In more particular embodiments, the configuration register may be further configured to store the first and second predetermined addresses. In such a case, the logic block is further configured to determine the first and second predetermined addresses from the configuration register. In such a case, the apparatus may be further configured to receive the first and second predetermined addresses at the configuration interface at a boot time of the apparatus and store the first and second predetermined addresses in the configuration registers in response thereto.

In other more particular embodiments of the apparatus, the write request and memory access request are received from the one or more central processing units operating in one of a plurality of limited address modes. For example, the plurality of limited address modes may include any combination of a real-mode, protected mode, and system management mode. In another example, the processor may be operating in the limited address mode while a Basic Input/Output System (BIOS) is executing at a boot time. In yet another example, the configuration register may be further configured to store unique sets of first and second predetermined address in the configuration register. In this case, each of the sets is dedicated to a separate one of the limited address modes, and the logic block is further configured to determine the first and second predetermined addresses from the configuration register based on the currently operating limited address mode.

In another embodiment of the invention, an apparatus is capable of being coupled to one or more central processing units, and to a system memory and system hardware. The apparatus includes a configuration register coupled to receive configuration requests from the system hardware. The apparatus also includes means for receiving, from the one or more central processing units, a write request targeted to a first predetermined address. A data portion of the write request comprises a target address of the system memory.

The apparatus further includes: means for sending the target address to the system interface in response to determining the write request is targeted to the first predetermined address; means for receiving the target address from the system memory and storing the target address in the configuration register; means for receiving, from the one or more central processing units, a memory access request targeted to a second predetermined address; means for retrieving the target address from the configuration register in response to determining the memory access request is targeted to the second predetermined address; and means for servicing the memory access request via the system memory using the target address retrieved from the configuration register.

In more particular embodiments, the configuration register may be further configured to store the first and second predetermined addresses. In such a case, the apparatus further includes means for determining the first and second predetermined addresses from the configuration register. Also in such a case, the apparatus may include means for setting the first and second predetermined addresses in the configuration registers at a boot time of the apparatus.

In one arrangement, the memory access request is targeted to a memory-mapped input-output device access. In other arrangements, the write request and memory access request are received from the one or more central processing units operating in a limited address mode that includes at least one of a one of a real-mode, protected mode, and system management mode. In such a case, the processor may be operating in the limited address mode while a Basic Input/Output System (BIOS) is executing at a boot time. In another variation, the configuration register is further configured to store unique sets of first and second predetermined address in the configuration register. Each of the sets is dedicated to a separate one of the limited address modes. In this variation, the apparatus further includes means to determine the first and second predetermined addresses from the configuration register based on the currently operating limited address mode These and various other advantages and features of novelty are pointed out with particularity in the claims annexed hereto and form a part hereof. However, for a better understanding of the invention, reference should be made to the drawings which form a further part hereof, and to accompanying descriptive matter, in which there are illustrated and described representative examples of systems, apparatuses, and methods in accordance with the invention.

DETAILED DESCRIPTION

Generally, the described embodiments are directed to a method, system, and apparatus for accessing system memory by processor(s) operating in limited address modes. In the discussion that follows, "memory" may refer to, but is not limited to, both main system memory (e.g., RAM) and memory-mapped input/output (I/O). As the term is used herein, "limited address mode" generally refers to a memory access using address words having insufficient number of bits to directly access all of the system memory by sole use of a single word of the address bus. For example, a 16-bit address word can directly address around 65,000 memory locations, which is a small amount of memory by modern computing system standards.

Although modern processors are often capable of using larger words to directly access memory (40 bit or greater direct memory access is now common), these processors may still support modes where more limited memory access is available (e.g., for backwards-compatibility). Thus in certain times during operation of a computer, the instruction that the processor(s) use to execute software may be limited in the address space they can directly access. Examples of some of these limited address modes include: 16-bit real-mode processor requests (limited to 16 bits); 32-bit protected mode processor requests (limited to 32 bits); system management mode requests to high memory (limited to 32 bits); legacy configuration requests (limited to 16 bits). These modes may be used at boot time while Basic Input/Output System (BIOS) or other system software is executing.

One problem with these limited address modes relates to accessing memory-mapped I/O devices. On large systems, I/O devices may be accessed via a number of methods, such as dedicated I/O ports/channels, I/O processors, and via calls directly to system memory space. In the latter case, the processors may use the same processor instructions and the same address bus to access both memory and I/O devices. In such a case, it may be desirable for I/O devices to be mapped to high memory addresses (>32 bits). It often becomes necessary for software to have full access to these I/O devices even if the processor is operating in a limited address mode.

Figure 1:
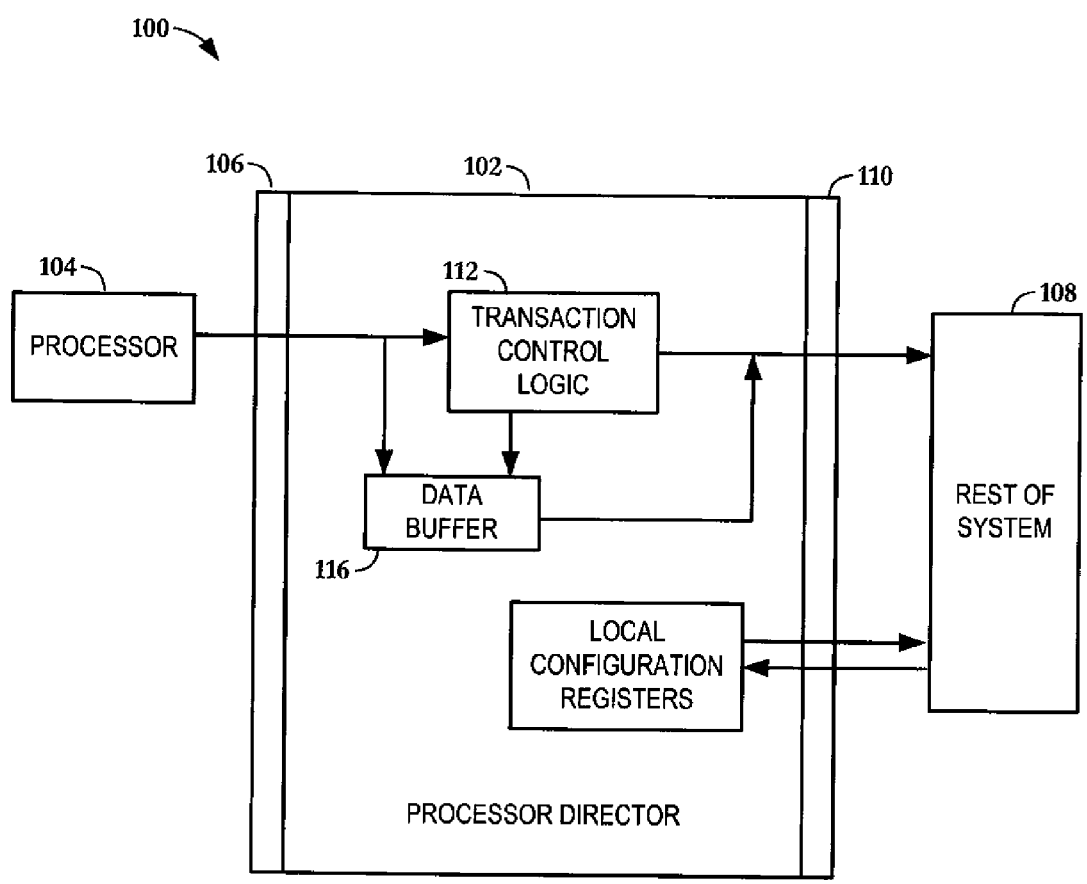
FIG. 1 is a block diagram illustrating an example computing system in which embodiments of the invention may be utilized.

In FIG. 1, a block diagram illustrates a processing system 100 having logic that allows a processor to access system memory in limited address modes. The processing system 100 may be a general-purpose or special-purpose processing apparatus that employs one or more central processing units 104 that are coupled to a processor director 102 that couples processors to memory and I/O in a multi-processor system. The processor director 102 is coupled to processors 104 via a front side bus 106 that provides the processors 104 access to the rest of the system 108. The system 108 may include system memory and interfaces for accessing memory-mapped input/output (I/O) devices. The processor director 102 is coupled to the rest of the system 108 via a system interface 110. The system interface 110 may provide common access to various system resources in a way that is reliable and highly scalable (e.g., via the Unisys™ Scalability Protocol).

In the illustrated system 100, the processors 104 may operate in certain modes where memory addressing is limited to less than the full number of address bits needed to access all the memory and I/O in the rest of the system 108. In one example, the address bus size is 40 bits and the data bus is 64 bits, but the processors 104 may operate in 16- or 32-bit addressing modes. Thus, the processor director 102 may include logic 112 and a data buffer 116 that allows software access to higher addresses.

Figure 2:
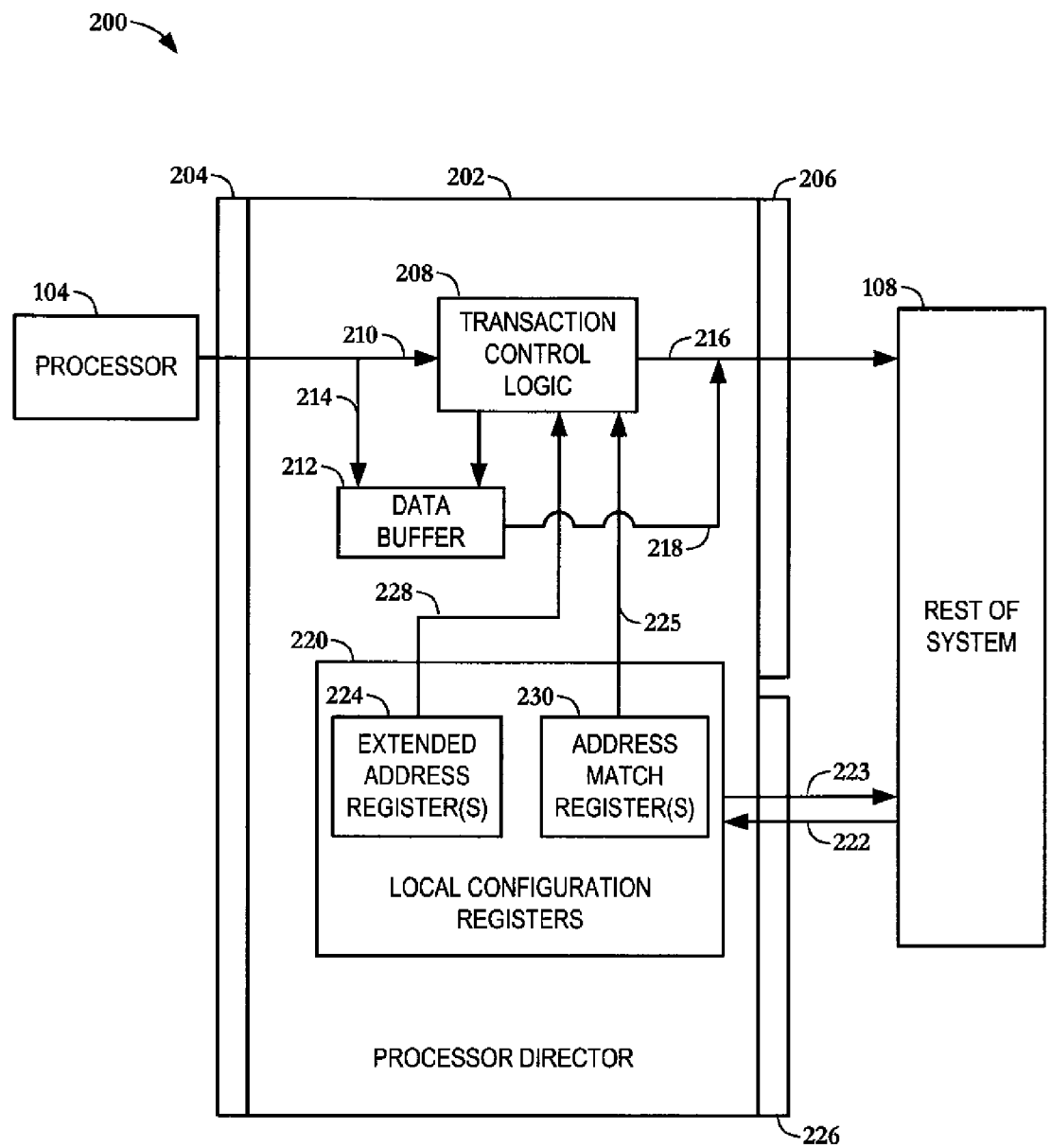
FIG. 2 is a block diagram illustrating a computing system according to an embodiment of the invention.

In reference now to FIG. 2, a block diagram shows a system according to an example embodiment of the invention that exhibits some advantages over the system shown in FIG. 1. Processors 104 and system 108 may be analogous components as those components having the same reference numerals as shown in FIG. 1. Generally, a processor director 202 couples processors 104 to rest of system 108 via respective front side bus 204 and system interface 206. The system 200 handles a limited address mode memory access as a two-part operation. A first transaction involves writing to a special address "A." The address "A" is communicated to transaction control logic 208 via path 210, and data "C" of the request is sent to buffer 212 via path 214. The data "C" sent via 214 as part of this request is the target address of the final system transaction (e.g., a 40-bit address which may be stored in a 64-bit data buffer 212).

The transaction control logic 208 recognizes special address "A" (e.g., by hard-wired logic and/or by comparing the address to one of the programmable address match registers 230) and transmits a new special system transaction to target system 108 via "normal" paths 216, 218, which are respective address and data paths for non-limited address space transactions. This first transaction is routed out to the system 108 and back to local configuration registers 220 of the processor director 202 via path 222. The target address "C" is then stored in an existing local configuration register, here shown as extended address register 224, via a local configuration register interface 226.

A second transaction is then read or written to a different special address "B" via paths 210, 214. The transaction control logic 208 recognizes special address "B" by comparing to another one of the programmable address match registers 230 and retrieves the target address "C" from register 224 via path 228. The transaction control logic 208 then transmits the final transaction (read or write) to system 108 via paths 216, 218. The special address "B" of the processor request is replaced with the contents ("C") of the extended address register 224 and sent along path 216.

This new solution minimizes the amount and complexity of unique logic needed to write the extended address register 224, because it utilizes existing data and transaction paths 218, 216 between the control logic 208 and the system 108, and existing paths 222, 223 between the system 108 and configuration registers 220. In some embodiments, programmable address match register(s) 230 may be used to specify the special addresses "A" and "B" to the transaction control logic 208 via path 225 rather than hard-wiring these values in the logic block 208.

Use of programmable registers 230 provides flexibility to adjust to software and system requirements. For example, the value of special addresses "A" and "B" may be written (or otherwise mapped to) to registers 230, e.g., before or during a system boot time. In one configuration, the special addresses "A" and "B" may be initialized at boot time by reading the values from a persistent storage, non-volatile RAM (NVRAM), switches, co-processor, system monitoring processor, maintenance processor, etc., and writing the address values to registers 230 via configuration interface 226.

Additionally, multiple sets of programmable address match registers 230 and extended address registers 224 may be used to provide extended address capability to different transaction types or extended address ranges concurrently. For example, a pair of each of the registers 230, 224 may be provided for each mode (e.g., real mode, system management mode, etc.) where FSB address size is limited. In such a case, each set 230, 224 may contain unique first and second predetermined addresses "A" and "B" dedicated to each mode. Spare sets for future functions may also be included with the register 220.

Address match registers 230 may also provide programmable disables to enable normal memory access to the addresses they contain. Thus in some cases special addresses "A" and "B" may be addressed as normal memory when a disable is activated. The fully programmable nature of the address match registers provides the flexibility to access all memory locations, regardless of the address mode limitations for any processor 104 that may connect to the processor director 202.

For purposes of illustration, the operation of the transaction control logic 202 is described in terms of functional circuitry and/or firmware modules that interact to provide particular results as are described above. Those skilled in the art will appreciate that other arrangements of functional modules are possible. Further, one skilled in the art can implement such described functionality using other combinations of circuit/software/firmware, either at a modular level or as a whole, based on the description provided herein. The transaction control logic 202 circuitry is only a representative example of hardware that can be used to a processor to access system memory in limited address modes using existing configuration registers.

In Listings 1 and 2 below, examples are presented below of how a memory read and write may be carried out in an apparatus according to an embodiment of the invention, such as the apparatus shown in FIG. 2.

1. Software needs to read memory address F0_0000_0000h, but processor is running in a mode limited to 32 bit addresses (FFFF_FFFFh max)
2. Software enables a set of address match registers 230 and programs special address A=1000h and special address B=2000h into the registers 230.
3. Processor 104 does a write transaction to address 1000h with data=F0_0000_0000h; data from the front side bus (FSB) 204 is captured by the data buffer 212.
4. Transaction control logic 208 does a compare of write address 1000h against special address "A" programmed in an address match register 230 resulting in a match.
5. Transaction control logic 208 then transmits a local memory write with data=F0_0000_0000h on the system interface 206. This data is sent along the normal existing path 218 from data buffer 212; the local memory write is addressed to target the extended address register 224.
6. The write is routed through system logic and eventually back to the local configuration register interface 226 where the extended address register 224 is updated to a value of F0_0000_0000h.
7. Processor 104 does a read transaction to address 2000h.

8. Transaction control logic 208 matches read address 2000h against another address match register 230 programmed with special address "B".
9. Transaction control logic 208 transmits a system read with an address of F0_0000_0000h as specified by the extended address register 224.

Listing 1

Read Example

1. Software needs to write memory address F0_0000_0000h to a value of 1234_5678_1234_5678h, but processor is running in a mode limited to 32 bit addresses (FFFF_FFFFh max)
2. Software enables a set of address match registers 230 and programs special address A=1000h and special address B=2000h into the registers 230.
3. Processor 104 does a write transaction to address 1000h with data=F0_0000_0000h; data from the FSB 204 is captured by the data buffer 212.
4. Transaction control logic 208 does a compare of write address 1000h against special address "A" programmed in an address match register 230 resulting in a match.
5. Transaction control logic 208 then transmits a local memory write with data=F0_0000_0000h on the system interface 206. This data is sent along the normal existing path 218 from data buffer 212. The local memory write is addressed to target the address register 224.
6. The write is routed through system logic and eventually back to the local configuration register interface where the extended address register 224 is updated to a value of F0_0000_0000h.
7. Processor does a write transaction to address 2000h. Write data 1234_5678_1234_5678h coming from FSB 204 is captured by the data buffer 212.
8. Transaction control logic 208 matches read address 2000h against another address match register 230 programmed with special address "B".
9. Transaction control logic 208 transmits a system write with an address of F0_0000_0000h as specified by the extended address register 224. Data 1234_5678_1234_5678h is sent from the data buffer 212 along with the write.

Listing 2

Write Example

Figure 3:
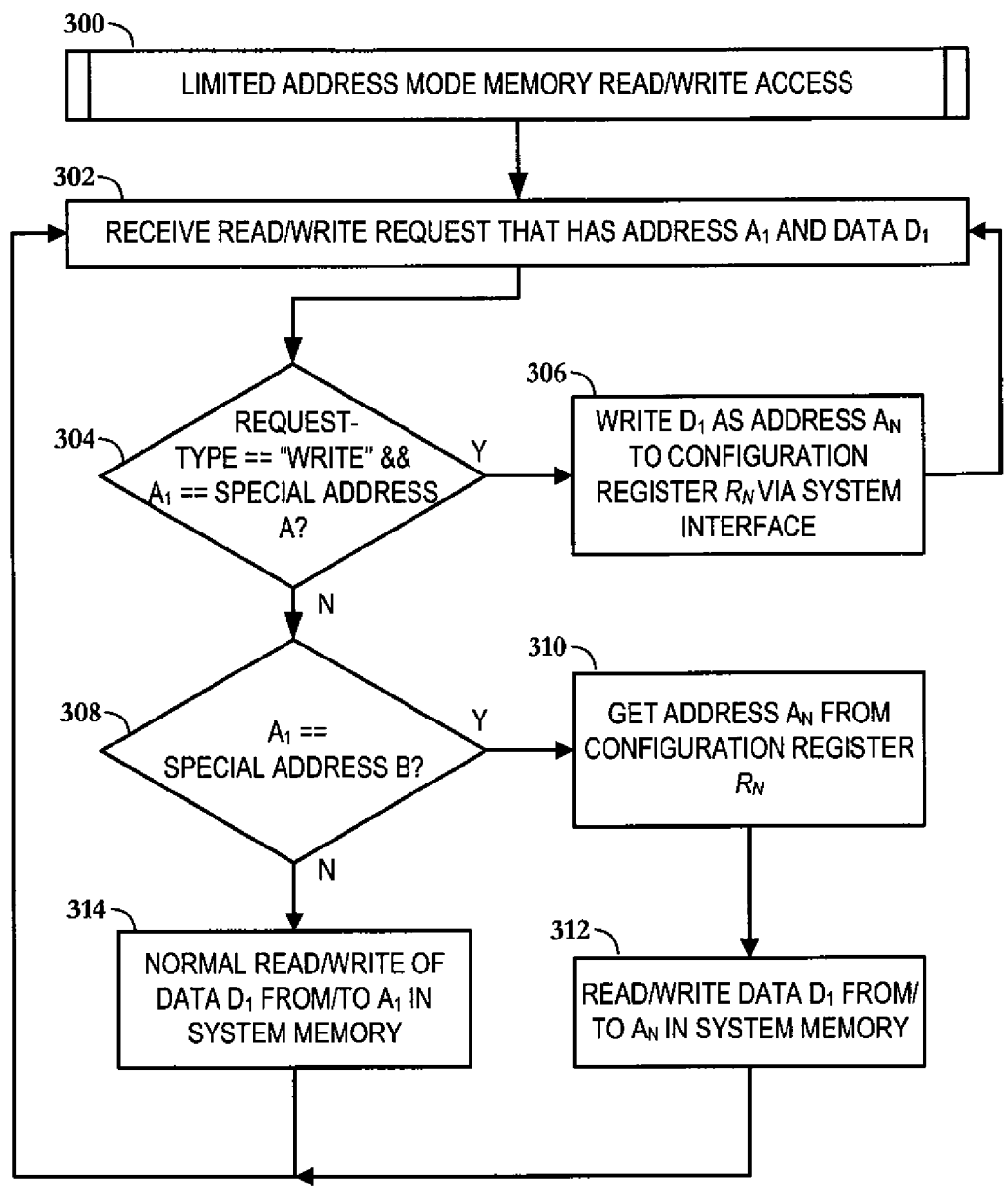
FIG. 3 is a flowchart illustrating a procedure for limited address mode memory read/write according to an embodiment of the invention.

In reference now to FIG. 3, a flowchart illustrates a procedure 300 for limited address mode memory read/write access according to an embodiment of the invention. The procedure involves receiving 302 (e.g., from a central processing unit) a read/write request that includes target address $A_1$ and data $D_1$. The read/write request is targeted for system memory, which may include RAM and memory mapped I/O. If it is determined 304 that the request is a write request and $A_1$ corresponds to a special address "A," then the data $D_1$ is written 306 to a configuration register $R_N$ via the system interface. Thereafter the data stored in the register $R_N$ is referred to as address $A_N$.

It will be appreciated that the singular term "register" here may refer to a collection of individually addressable/accessible register memory locations. The processor director may have a number of registers reserved for purposes of storing addresses for limited address mode memory access, e.g., one or more registers per processor, processor core, process, thread, addressing mode, etc. In some architectures, the address $A_N$ may be sent out to system hardware via a scalable system interface, and then received back from a configuration interface that is also coupled to the system hardware. The configuration interface is coupled to the configuration register within the processor director for setting configuration registers with data received from the rest of the system, e.g., from a processor director or an external maintenance processor.

If the address $A_1$ does not correspond to special address "A," but it is determined 308 that $A_1$ of the request (whether read or write) corresponds to special address "B," then address $A_N$ is retrieved 310 from register $R_N$ (e.g., having been stored there from a previous write step, e.g., as in 306). In such a case, the data $D_1$ is read/written 312 from/to system memory at address $A_N$ that was retrieved from the configuration register at 310. If the address $A_1$ of the request corresponds to neither of special addresses "A" and "B," then a normal read/write 314 of the data commences. In all of the illustrated outcomes 306, 312, 314, the procedure loops (e.g., continues in an infinite loop) again to wait for/receive the next request at 302.

It will be appreciated that the illustrated procedure 300 is provided for purposes of example and not limitation, and many variations are possible. For example, additional operations of setting and/or obtaining the special addresses A & B to/from a configuration register may be also included in the procedure 300 at some point before making comparisons 304, 308 with the request address. The operations of the procedure 300 may be carried out by any combination of digital logic circuitry, software and firmware, including the example computing systems shown herein at FIGS. 1 and 2.

Figure 4:
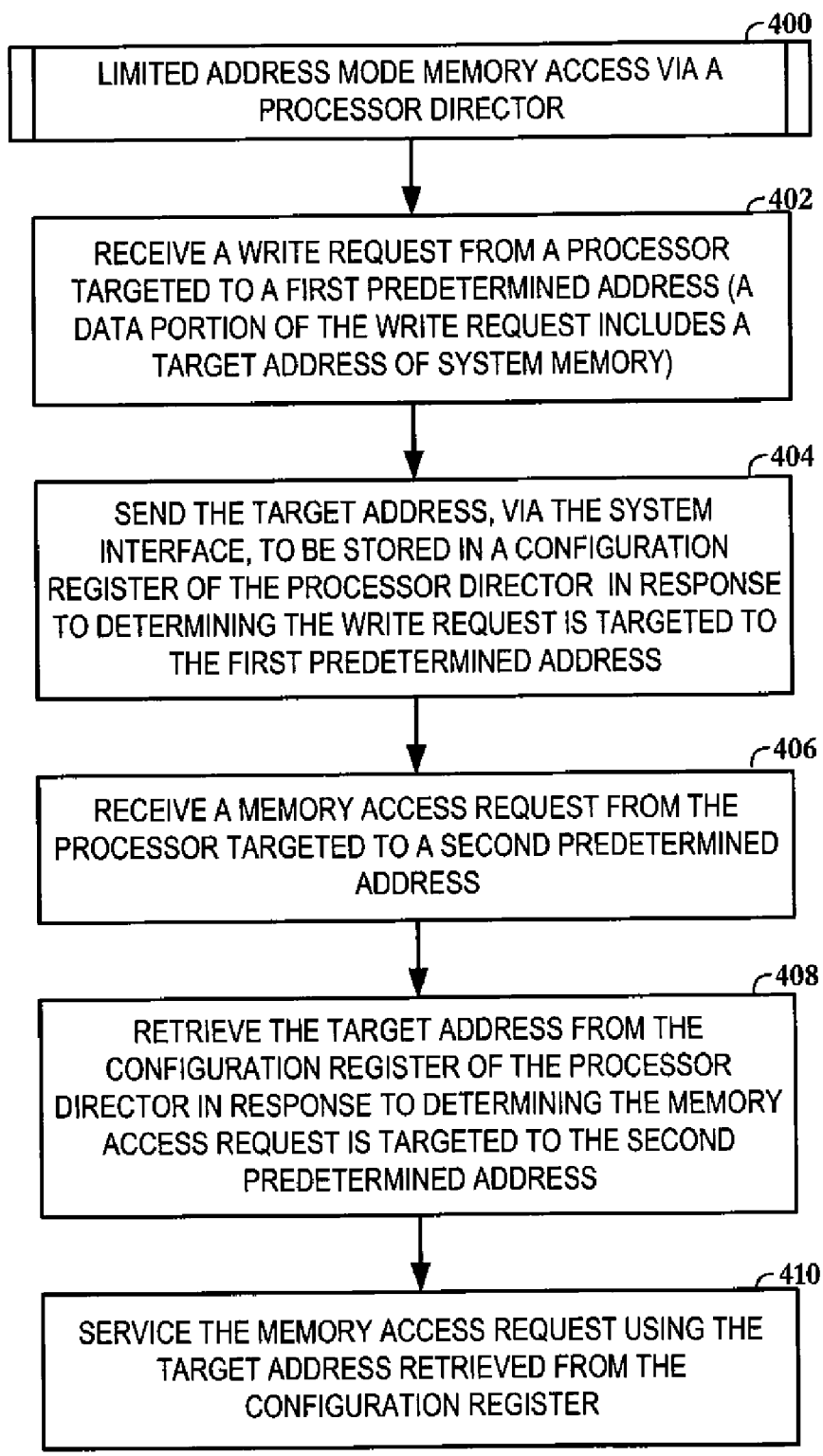
FIG. 4 is a flowchart illustrating a procedure for limited address mode memory access via a processor director according to an embodiment of the invention.

In reference now to FIG. 4, a flowchart illustrates a procedure 400 for limited mode memory access via a processor director according to an example embodiment of the invention. The procedure 400 involves receiving 402 a write request from a processor targeted to a first predetermined address. A data portion of the write request includes a target address of system memory. The target address is sent 404, via the system interface, to be stored in a configuration register of the processor director in response to determining the write request is targeted to the first predetermined address. A memory access request (e.g., read or write) is received 406 from the processor and is targeted to a second predetermined address. The target address is retrieved 408 from the configuration register of the processor director in response to determining the memory access request is targeted to the second predetermined address. The memory access request (e.g., read or write) is serviced 410 using the target address retrieved from the configuration register.

The steps of the procedure 400 may be carried out by any combination of digital logic circuitry, software and firmware, including the example computing systems shown herein at FIGS. 1 and 2. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims

What is claimed is:
1. A method for supporting limited address mode memory access via a processor director that couples a processor to system memory and system hardware via a system interface of the processor director, the method comprising:

receiving a write request from the processor targeted to a first predetermined address, wherein a data portion of the write request comprises a target address of the system memory;

sending the target address via the system interface targeted to be stored in a configuration register of the processor director in response to determining the write request is targeted to the first predetermined address;

receiving a memory access request from the processor targeted to a second predetermined address;

retrieving the target address from the configuration register of the processor director in response to determining the memory access request is targeted to the second predetermined address; and servicing the memory access request using the target address retrieved from the configuration register.

2. The method according to claim 1, wherein the processor director comprises a configuration interface coupled to the configuration register within the processor director, and wherein sending the target address to be stored in the configuration register comprises receiving the target address via the configuration interface.

3. The method according to claim 1, further comprising storing the first and second predetermined addresses at the configuration register at a system boot time and determining the first and second predetermined addresses from the configuration register.

4. The method according to claim 1, wherein the write request and memory access request are received from the processor operating in one of a plurality of limited address modes.

5. The method according to claim 4, wherein the plurality of limited address modes comprise any combination of a real-mode, protected mode, and system management mode.

6. The method according to claim 4, wherein the processor is operating in a selected one of the limited address modes while a Basic Input/Output System (BIOS) is executing at a system boot time.

7. The method according to claim 4, further comprising:

storing unique sets of first and second predetermined address in the configuration register, wherein each of the sets is dedicated to a separate one of the limited address modes; and determining the first and second predetermined addresses from the configuration register based on the currently operating limited address mode.

8. An apparatus configured to couple one or more central processing units of a computing system to system hardware and system memory, the apparatus comprising:

a front side bus interface that interfaces with the one or more central processing units;

a system interface that interfaces with the system memory and the system hardware;

a configuration interface that interfaces with the system hardware for receiving configuration requests;

a configuration register coupled to the configuration interface; and a logic block coupled to the front side bus interface, the system interface, and the configuration register, the logic block configured to:

receive, via the front side bus interface, a write request that includes a target address in a data portion of the write request;

in response to determining the write request is targeted to a first predetermined address, send the target address via the system interface targeted for the configuration register, wherein the configuration register receives the target address via the configuration interface and stores the target address in response thereto;

receive a memory access request via the front side bus interface;

retrieve the target address from the configuration register in response to determining that the memory access request is targeted to a second predetermined address; and service the memory access request via the system interface using the target address retrieved from the configuration register.

9. The apparatus according to claim 8, wherein the configuration register is further configured to store the first and second predetermined addresses, and wherein the logic block is further configured to determine the first and second predetermined addresses from the configuration register.

10. The apparatus according to claim 9, wherein the apparatus is configured to receive the first and second predetermined addresses at the configuration interface at a boot time of the apparatus and store the first and second predetermined addresses in the configuration registers in response thereto.

11. The apparatus according to claim 8, wherein the write request and memory access request are received from the one or more central processing units operating in one of a plurality of limited address modes.

12. The apparatus according to claim 11, wherein the plurality of limited address modes comprise any combination of a real-mode, protected mode, and system management mode.

13. The apparatus according to claim 11, wherein the processor is operating in the limited address mode while a Basic Input/Output System (BIOS) is executing at a boot time.

14. The apparatus according to claim 11, wherein the configuration register is further configured to store unique sets of first and second predetermined address in the configuration register, wherein each of the sets is dedicated to a separate one of the limited address modes, and wherein the logic block is further configured to determine the first and second predetermined addresses from the configuration register based on the currently operating limited address mode.

15. An apparatus configured to couple with one or more central processing units via a front-side bus and to couple with a system memory and system hardware via a system interface, the apparatus comprising:

a configuration register coupled to receive configuration requests from the system hardware;

means for receiving, from the one or more central processing units, a write request targeted to a first predetermined address, wherein a data portion of the write request comprises a target address of the system memory;

means for sending the target address via the system interface in response to determining the write request is targeted to the first predetermined address;

means for receiving the target address from the system hardware and storing the target address in the configuration register;

means for receiving, from the one or more central processing units, a memory access request targeted to a second predetermined address;

means for retrieving the target address from the configuration register in response to determining the memory access request is targeted to the second predetermined address; and means for servicing the memory access request via the system memory using the target address retrieved from the configuration register.

16. The apparatus according to claim 15 wherein the configuration register is further configured to store the first and second predetermined addresses, and wherein the apparatus further comprises means for determining the first and second predetermined addresses from the configuration register.

17. The apparatus according to claim 16, further comprising means for setting the first and second predetermined addresses in the configuration registers at a boot time of the apparatus.

18. The apparatus according to claim 15, wherein the write request and memory access request are received from the one or more central processing units operating in a limited address mode comprising at least one of a one of a real-mode, protected mode, and system management mode.

19. The apparatus according to claim 18, wherein the processor is operating in the limited address mode while a Basic Input/Output System (BIOS) is executing at a boot time.

20. The apparatus according to claim 18, wherein the configuration register is further configured to store unique sets of first and second predetermined address in the configuration register, wherein each of the sets is dedicated to a separate one of the limited address modes, the apparatus further comprising means to determine the first and second predetermined addresses from the configuration register based on the currently operating limited address mode.

* * * * *